(12) United States Patent
Jiang et al.

(10) Patent No.: US 10,317,739 B2
(45) Date of Patent: Jun. 11, 2019

(54) ARRAY SUBSTRATE, MANUFACTURING METHOD THEREOF, DISPLAY PANEL AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Peng Jiang, Beijing (CN); Haipeng Yang, Beijing (CN); Ke Dai, Beijing (CN); Yongjun Yoon, Beijing (CN); Zhangtao Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 17 days.

(21) Appl. No.: 15/528,799

(22) PCT Filed: Aug. 17, 2016

(86) PCT No.: PCT/CN2016/095663
§ 371 (c)(1),
(2) Date: May 23, 2017

(87) PCT Pub. No.: WO2017/177589
PCT Pub. Date: Oct. 19, 2017

(65) Prior Publication Data
US 2018/0188567 A1     Jul. 5, 2018

(30) Foreign Application Priority Data

Apr. 15, 2016 (CN) .......................... 2016 1 0235147

(51) Int. Cl.
*G02F 1/1343* (2006.01)
*G02F 1/1345* (2006.01)
(Continued)

(52) U.S. Cl.
CPC ........ *G02F 1/1343* (2013.01); *G02F 1/13306* (2013.01); *G02F 1/134309* (2013.01); *G02F 1/136286* (2013.01); *G02F 2201/121* (2013.01)

(58) Field of Classification Search
CPC ........ G02F 1/136286; G02F 1/134363; G02F 1/134309; G02F 1/1368; G02F 1/133345;
(Continued)

(56) References Cited

U.S. PATENT DOCUMENTS

2003/0133066 A1* 7/2003 Ono ................... G02F 1/134363
349/141
2005/0140896 A1* 6/2005 Chae ................. G02F 1/134363
349/141
(Continued)

FOREIGN PATENT DOCUMENTS

CN 103077944 A 5/2013
CN 202975548 A 6/2013
(Continued)

OTHER PUBLICATIONS

English translation of PCT International Search Report, Application No. PCT/CN2016/095663, dated Jan. 20, 2017, 2 pages.
(Continued)

*Primary Examiner* — Thoi V Duong
(74) *Attorney, Agent, or Firm* — Armstrong Teasdale LLP

(57) ABSTRACT

Embodiments of the disclosure provide an array substrate, a manufacturing method for an array substrate, a display panel, and a display apparatus. The array substrate according to one embodiment including a gate line extending in a first direction, a data line extending in a second direction differ-
(Continued)

ent from the first direction, a first common electrode line extending in the first direction, a second common electrode line extending in the second direction, and common electrodes in which the common electrodes at both sides of and adjacent to the second common electrode line are electrically connected to the second common electrode line.

16 Claims, 10 Drawing Sheets

(51) Int. Cl.
    *G02F 1/133*     (2006.01)
    *G02F 1/1362*     (2006.01)

(58) Field of Classification Search
    CPC ............. G02F 1/136227; G02F 1/1362; G02F 1/134336; G02F 1/13452; G02F 1/1343; G02F 1/1345; G02F 1/13454; G02F 2001/134318; G02F 2201/123; G02F 1/13306; G02F 2201/121; G09G 3/3648; G09G 3/3611; G09G 3/3688; G09G 2300/0426
See application file for complete search history.

(56) References Cited

U.S. PATENT DOCUMENTS

2008/0111962 A1* 5/2008 Lin .................. G02F 1/136286
                                                 349/139
2014/0131718 A1* 5/2014 Xue ...................... H01L 27/124
                                                 257/71

FOREIGN PATENT DOCUMENTS

| CN | 104216183 A | 12/2014 |
| CN | 104914640 A | 9/2015 |
| CN | 105652547 A | 6/2016 |
| KR | 20110031597 A | 3/2011 |

OTHER PUBLICATIONS

PCT Written Opinion, Application No. PCT/CN2016/095663, dated Jan. 20, 2017, 6 pages.: with English translation of relevant part.

* cited by examiner

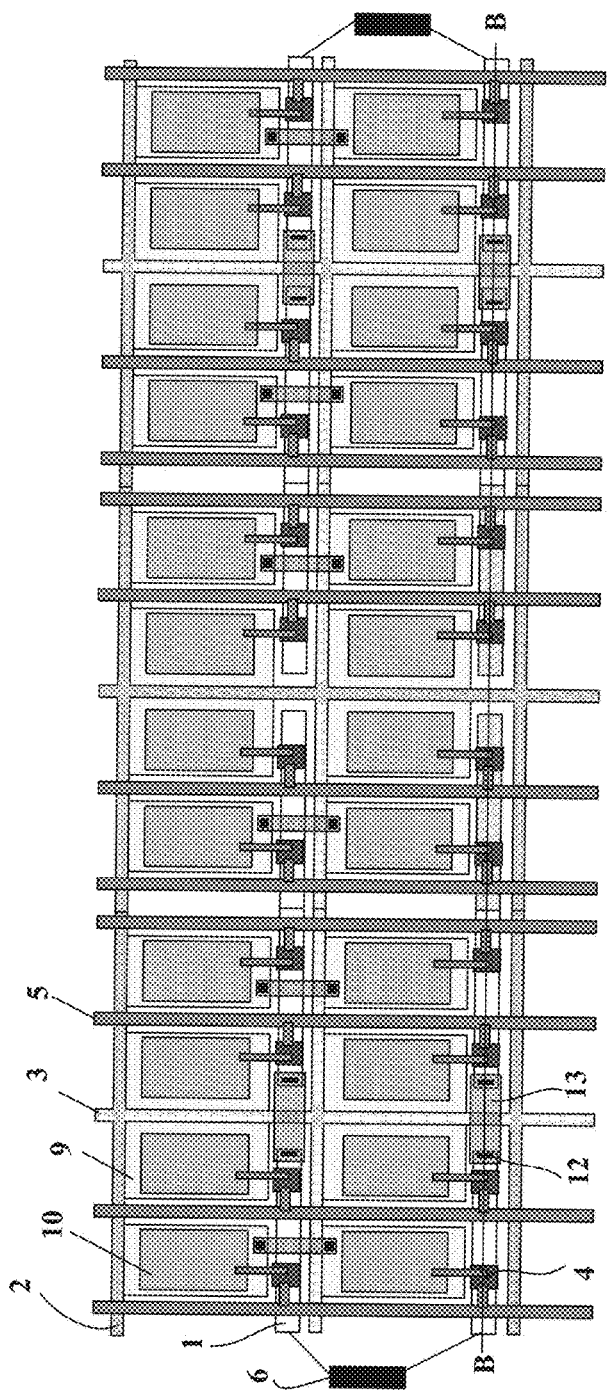
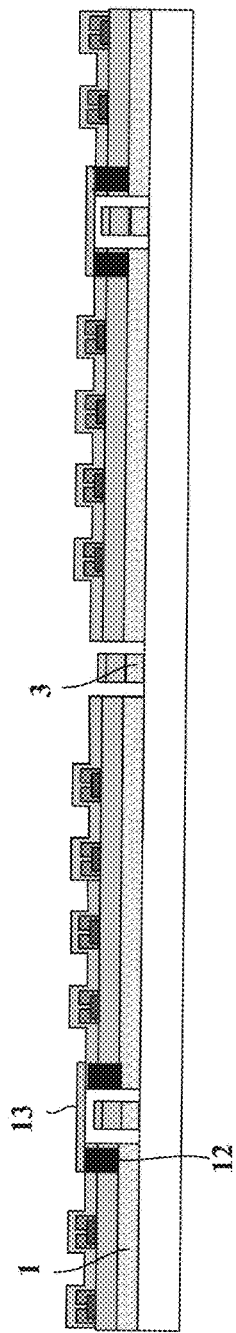
Fig. 2A
Fig. 2B

ARRAY SUBSTRATE, MANUFACTURING METHOD THEREOF, DISPLAY PANEL AND DISPLAY APPARATUS

CROSS REFERENCE TO RELATED APPLICATIONS

This patent application is a National Stage Entry of PCT/CN2016/095663 filed on Aug. 17, 2016, which claims the benefit and priority of Chinese Patent Application No. 201610235147.8 filed on Apr. 15, 2016, the disclosures of which are incorporated by reference herein in their entirety as part of the present application.

BACKGROUND

Embodiments of the disclosure relate to display field, and more particularly, to an array substrate, a manufacturing method for an array substrate, a display panel, and a display apparatus.

During driving of a liquid crystal in a liquid crystal display apparatus, an electric field is formed between a pixel electrode and a common electrode and the liquid crystal is deflected, an angle by which the liquid crystal is deflected will vary and transmittance will vary by controlling a signal of the pixel electrode, thereby forming display of different pictures.

During driving of the liquid crystal, the ideal state of the common electrode is a constant value. In practice, however, the common electrode is overlapped with both an in-plane gate line and a data line, thus there will be a coupling capacitance. Since signals of the gate line and the data line are changing constantly, the signal of the common electrode will be pulled under the action of the coupling capacitance. Defects such as after image, greenish, crosstalk etc. will arise when the common electrode has been pulled, which are several difficult-to-solve defects in a display.

Generally, the related defects are solved mainly by optimizing peripheral common electrode lines of a display panel and compensating for signals of common electrodes of the circuit. However, with product upgrading, frame of a product becomes narrower and narrower, the space for peripheral common electrode lines is compressed and wiring resistance is increased, such that the related defects cannot be improved even by circuit compensation. Within a display panel of a prior design, metal common electrodes (formed by metal of gate lines) only exist in lateral direction, while in longitudinal direction, they are connected mainly through Indium Tin Oxide (ITO) and vias, and uniformity of the longitudinal common electrodes is poor.

BRIEF DESCRIPTION

To solve the above problem in the art, embodiments of the disclosure significantly improve the uniformity in resistance of the common electrodes by adding a longitudinal common electrode line. Specifically, the following technical solutions are provided.

[1] An array substrate includes a gate line extending in a first direction, a data line extending in a second direction different from the first direction, a first common electrode line extending in the first direction, a second common electrode line extending in the second direction, and common electrodes in which the common electrodes at both sides of and adjacent to the second common electrode line are electrically connected to the second common electrode line.

In the array substrate of the above solution [1], the uniformity in resistance of the common electrodes is improved by adding a second common electrode line in a second direction, which improves defects such as after image, greenish, crosstalk etc.

[2] The array substrate according to the above solution [1], wherein the gate line, the first common electrode line, and the second common electrode line are formed in a same layer with a same conductive material.

[3] The array substrate according to the above solution [2], wherein the first common electrode line and the second common electrode line are directly connected.

In the array substrate of the above solutions [2] and [3], by forming the first common electrode line and the second common electrode line in a same layer with a same conductive material, manufacturing cost will not be increased while improving the uniformity in resistance of the common electrodes. Further, by directly connecting the first common electrode line and the second common electrode line, thereby forming a network of common electrode lines, the uniformity in resistance of the common electrodes can be further improved.

[4] The array substrate according to any one of the above solutions [1] to [3], wherein the common electrodes at both sides of the gate line and not adjacent to the second common electrode line are electrically connected via pixel electrode material across the gate line.

[5] The array substrate according to any one of the above solutions [1] to [4], wherein pixel units at both sides of the second common electrode line are in mirror relationship.

In the array substrate of the above solution [5], by making pixel units at both sides of the second common electrode line being in mirror relationship, aperture ratio will not be affected while improving the uniformity in resistance of the common electrodes.

[6] The array substrate according to any one of the above solutions [1] to [5], wherein there are driving circuits connected to the gate line at both sides of the second common electrode line.

[7] The array substrate according to the above solution [6], wherein, in case that the number of the second common electrode line is one, the gate lines at both sides of the second common electrode line are not connected.

[8] The array substrate according to the above solution [6], wherein, in case that the number of the second common electrode line is more than one, the gate lines at both sides of one of the plurality of second common electrode lines are not connected, and the gate lines at both sides of the remaining second common electrode lines of the plurality of second common electrode lines are electrically connected via pixel electrode material across the remaining second common electrode lines.

[9] The array substrate according to any one of the above solutions [1] to [8], wherein there is a driving circuit connected to the gate line at only one side of the second common electrode line.

[10] The array substrate according to the above solution [9], wherein the gate lines at both sides of the second common electrode line are electrically connected via pixel electrode material across the second common electrode line.

[11] The array substrate according to any one of the above solutions [1] to [10], wherein the first direction is perpendicular to the second direction.

[12] The array substrate according to any one of the above solutions [1] to [11], wherein at least one of the gate line, the first common electrode line, and the second common electrode line includes metal.

[13] The array substrate according to any one of the above solutions [1] to [12], wherein at least one of the common electrode and the pixel electrode material includes Indium Tin Oxide.

[14] The array substrate according to any one of the above solutions [1], [4], [6], [9], [11] to [13], wherein the first common electrode line and the second common electrode line are in different layers.

[15] The array substrate according to the above solution [14], wherein the first common electrode line and the second common electrode line are electrically connected at an intersection through a via.

[16] A display panel including the array substrate according to any one of the above solutions [1] to [15].

[17] A display apparatus including the array substrate according to any one of the above solutions [1] to [15].

The above display panel and display apparatus possess the advantages of the above array substrate, that is, the advantages of improving the uniformity in resistance of the common electrodes, and improving defects such as after image, greenish, crosstalk, etc.

[18] A manufacturing method for an array substrate includes forming common electrodes on the substrate, forming a gate line extending in a first direction on the substrate, forming a first common electrode line extending in the first direction on the substrate, and forming a second common electrode line extending in a second direction different from the first direction on the substrate, wherein the common electrodes at both sides of and adjacent to the second common electrode line are electrically connected to the second common electrode line.

In the manufacturing method for an array substrate of the above solution [18], the uniformity in resistance of the common electrodes is improved by adding a second common electrode line in a second direction, which improves defects such as after image, greenish, crosstalk, etc.

BRIEF DESCRIPTION OF THE DRAWINGS

To illustrate the technical solutions of embodiments of the disclosure more clearly, drawings of the embodiments will be briefly described below. It is apparent that the below described drawings are merely some of the embodiments of the disclosure, and are not limitations on the present disclosure.

FIG. 2A is a schematic diagram of a two-side driving array substrate according to another embodiment of the present disclosure, and FIG. 2B is a sectional view taken along line B-B in FIG. 2A.

DETAILED DESCRIPTION

To make the technical solutions and advantages of embodiments of the present disclosure more apparent, the technical solutions of the embodiments of the present disclosure will be described below clearly and completely in connection with the drawings. Apparently, the described embodiments are just part of rather than all of the embodiments of the present disclosure. Based on the described embodiments, all other embodiments obtained by those skilled in the art without any inventive work are within protection scope of the present disclosure.

In description of the present disclosure, it should be noted that, orientation or positional relationship indicated by terms such as "up", "down", "top" and "bottom" are orientation or positional relationship shown based on the drawings. These terms are only for convenience of description and for simplifying description, and do not indicate or imply that the apparatus or element referred to must have particular orientation, being constructed or operated in particular orientation, thus, they should not be construed to be limitation on the present disclosure.

Furthermore, in description of the present disclosure, the phase "a plurality of" means two or more and "a plurality of lines" means two or more lines unless otherwise stated.

Figure 8A:
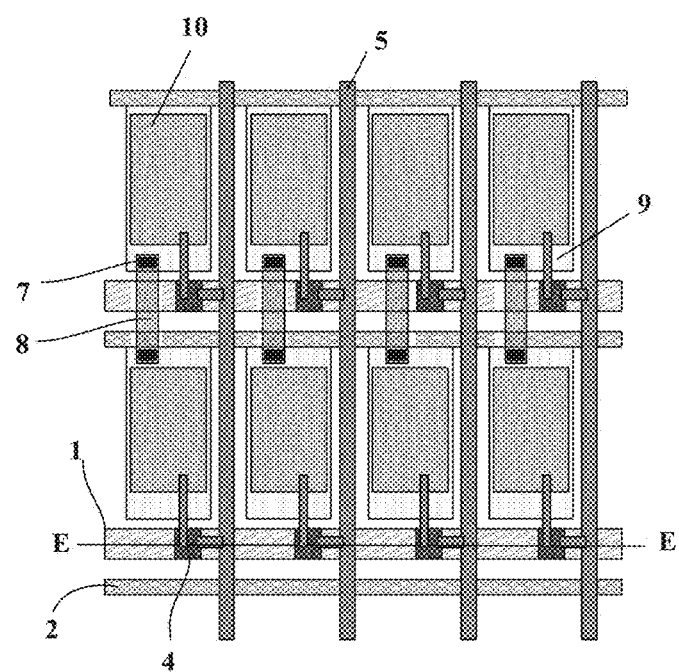
FIG. 8A is a schematic diagram of an existing array substrate.
Figure 8B:
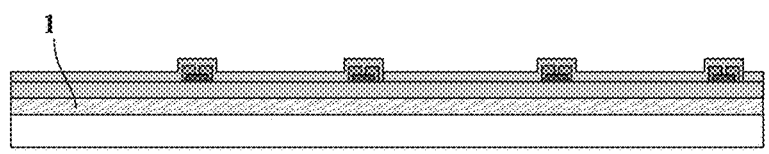
FIG. 8B is a sectional view taken along line E-E in FIG. 8A.
Figure 9:
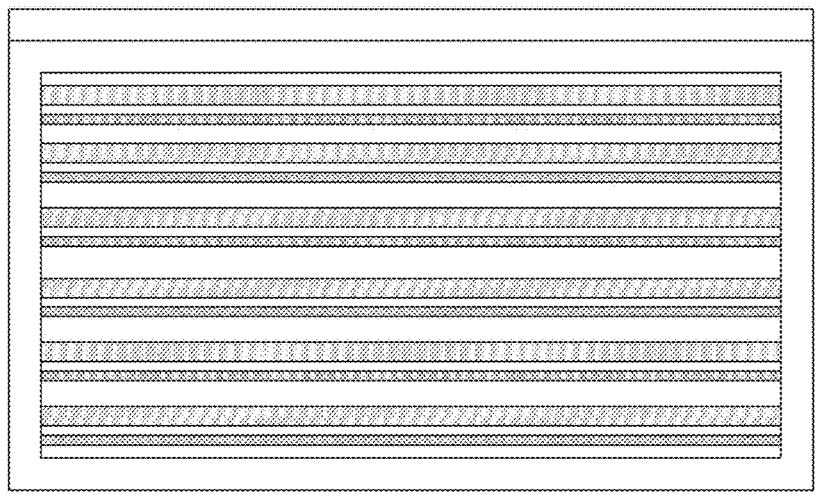
FIG. 9 is a schematic diagram of an existing GOA driving array substrate.
Figure 10:
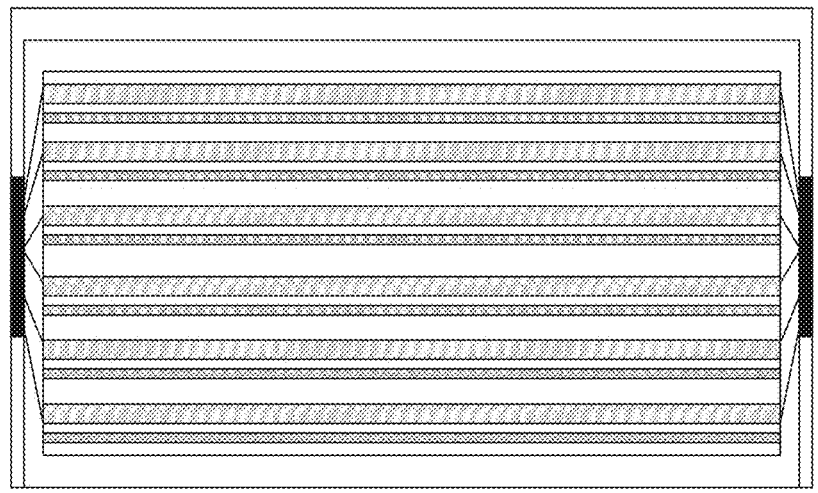
FIG. 10 is a schematic diagram of an existing COF driving array substrate.

FIGS. 8A-10 illustrate existing array substrates. Specifically, FIG. 8A is a schematic diagram of an existing array substrate, and FIG. 8B is a sectional view taken along line E-E in FIG. 8A. FIG. 9 is a schematic diagram of an existing GOA (Gate Driver on Array) driving array substrate. FIG. 10 is a schematic diagram of an existing COF (Chip On Flex or Chip On Film) driving array substrate.

As shown in FIGS. 8A and 8B, a lateral common electrode line is formed in parallel to a gate line 1, and in longitudinal direction, common electrodes 9 at both sides of the gate line 1 are connected through pixel electrode material (such as ITO) 8 and two vias 7. Since resistivity of the pixel electrode material 8 is much larger than that of metal, uniformity of in-plane resistance of the longitudinal common electrodes is poor.

Embodiments of the disclosure significantly improve the uniformity in resistance of the common electrodes by adding a longitudinal common electrode line.

Next, various embodiments of the disclosure will be described in detail in conjunction with drawings.

<Array Substrate>

Figure 1A:
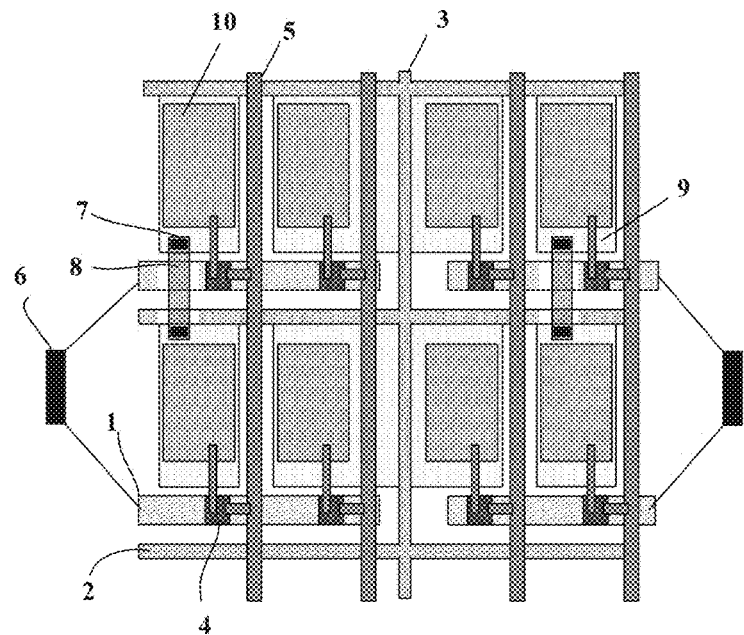
FIG. 1A is a schematic diagram of a two-side driving array substrate according to an embodiment of the present disclosure.
Figure 1B:
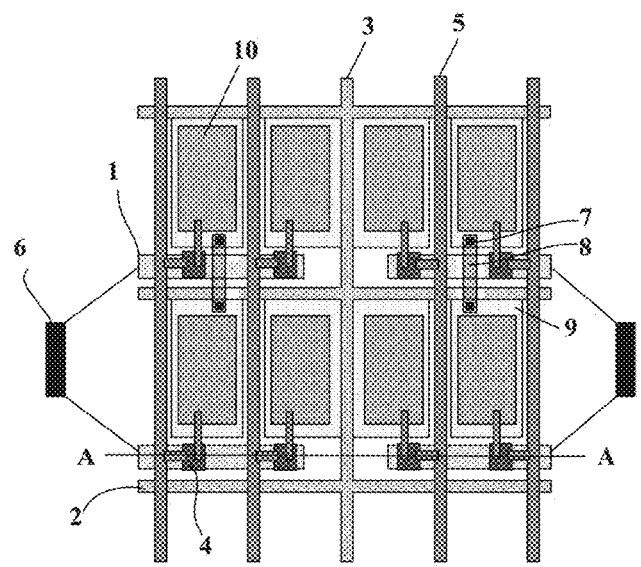
FIG. 1B is a schematic diagram of a two-side driving array substrate according to another embodiment of the present disclosure.
Figure 1C:
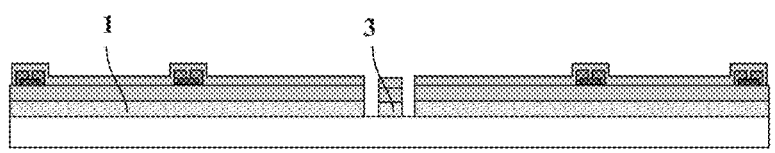
FIG. 1C is a sectional view taken along line A-A in FIG. 1B.

FIG. 1A is a schematic diagram of a two-side driving array substrate according to an embodiment of the present disclosure, FIG. 1B is a schematic diagram of a two-side driving array substrate according to another embodiment of the present disclosure, and FIG. 1C is a sectional view taken along line A-A in FIG. 1B.

As shown in FIG. 1A, an array substrate of the present embodiment includes a gate line 1 extending in a first direction, a data line 5 extending in a second direction different from the first direction, a first common electrode line 2 extending in the first direction, a second common electrode line 3 extending in the second direction, and common electrodes 9 in which the common electrodes at both sides of and adjacent to the second common electrode line are electrically connected to the second common electrode line.

As shown in FIGS. 1A-1C, pixel units having pixel electrodes and common electrodes are formed at regions divided by the gate line 1 and the data line 5. The common electrodes of a plurality of pixel units arranged in the second direction are all separated by the gate line 1. In addition, when the common electrodes and the gate line 1 are not in a same layer, it may also be the case that the common electrodes of at least part of a plurality of pixel units arranged in the second direction are separated.

In FIG. 1A, although a two-side driving array substrate is shown, it is appreciated that driving manner of the present embodiment is not limited to two-side driving, it may also be single-side driving or any other driving manner known to those skilled in the art.

In addition, although the driving circuit 6 shown in FIG. 1A is COF, the driving circuit of the present embodiment is not limited to COF, it may also be GOA or any other driving circuit known to those skilled in the art.

In addition, although it is shown in FIG. 1A that the gate line 1 and the first common electrode line 2 extend in lateral direction, that is, the first direction is lateral direction, the array substrate of the present embodiment is not limited thereto, the gate line 1 and the first common electrode line 2 may also extend in longitudinal direction. In the present embodiment, the second direction is perpendicular to the first direction. Next, the description is made by taking that the first direction is lateral direction and the second direction is longitudinal direction for example.

In the present embodiment, as shown in FIG. 1A, the gate line 1, the first common electrode line 2, and the second common electrode line 3 are formed in a same layer and are made of a same conductive material. Further, as shown in FIG. 1A, the first common electrode line 2 and the second common electrode line 3 are directly connected and form a crossroad like shape at the intersection.

In the present embodiment, by forming the gate line, the first common electrode line, and the second common electrode line in a same layer with a same conductive material, manufacturing cost will not be increased while improving the uniformity in resistance of the common electrodes. Further, by directly connecting the first common electrode line and the second common electrode line, thereby forming a network of common electrode lines, the uniformity in resistance of the common electrodes can be further improved.

In the present embodiment, a plurality of gate lines 1 and first common electrode lines 2 are formed. There may be one or multiple second common electrode lines 3. Next, an array substrate having one second common electrode line 3 and driven from two sides will be described in conjunction with FIG. 1A.

As shown in FIG. 1A, each pixel unit has one switching circuit 4, the switching circuit 4 may be any switching circuit known to those skilled in the art, such as a TFT transistor, and the present embodiment has no limitation thereon. Next, the description will be made by taking TFT transistor for example.

One of a source and a drain of the TFT transistor is connected to the data line 5, and the other is connected to the pixel electrode 10, a gate of the TFT transistor is connected to the gate line 1.

In the present embodiment, the gate line, the first common electrode line, and the second common electrode line include metal or other conductive material having high conductivity, and the present embodiment has no limitation thereon.

In the present embodiment, the common electrodes 9 and the pixel electrodes 10 include Indium Tin Oxide (ITO) or other material having high conductivity and transparency, and the present embodiment has no limitation thereon.

As shown in FIG. 1A, the common electrodes 9 at both sides of and adjacent to the second common electrode line 3 (that is, the four common electrodes in the middle of FIG. 1A) are electrically connected to the second common electrode line 3 directly, so that the uniformity in resistance of the longitudinal common electrodes may be improved, and defects such as after image, greenish, crosstalk, etc. are improved.

In addition, the common electrodes not adjacent to the second common electrode line 3 in the longitudinal direction are interrupted in the longitudinal direction by the gate line 1, these common electrodes 9 located at both sides of the gate line 1 (that is, the four outmost common electrodes in FIG. 1A) are electrically connected via pixel electrode material 8 and two vias 7.

As shown in FIG. 1A, since the array substrate is driven from two sides and only one second common electrode line 3 is inserted, there is no need to connect the gate line at both sides of the second common electrode line and interrupted by the second common electrode line.

FIG. 1A shows an embodiment in which a second common electrode line 3 is inserted next to the data line 5 in a case that arrangement of the pixel units is not changed, however, the present embodiment is not limited thereto. In order not to make aperture ratio decrease, it is also possible to insert a second common electrode line at the location of the original data line 5, then what is needed is to arrange the pixel units at both sides of the second common electrode line into mirror relationship, and FIG. 1B shows such an embodiment.

As shown in FIG. 1B, the pixel units at both sides of the second common electrode line are in mirror relationship. In the present embodiment, the pixel units at both sides of the second common electrode line are made in mirror relationship by changing arrangement of the pixel units within the array substrate, and in contrast to the embodiment in which a second common electrode line is added next to the data line 5 shown in FIG. 1A, decrease in aperture ratio can be avoided.

The following embodiments will be described by taking that the pixel units at both sides of the second common electrode line are in mirror relationship for example, however, it is appreciated that, in the following embodiments, the second common electrode line may also be inserted as in FIG. 1A, so that arrangement manner of the pixel units may not be changed.

An embodiment in which there is one second common electrode line 3 has been described above, however, the number of the second common electrode line is not limited to one, and there may be any number of second common electrode lines. A case in which there are a plurality of second common electrode lines 3 and the array substrate is driven from two sides will be described below in conjunction with FIGS. 2A-2B.

As shown in FIGS. 2A-2B, the number of the second common electrode lines is three, however, it is appreciated that there may be any number of second common electrode lines. The description below will be made by taking three second common electrode lines for example.

As shown in FIG. 2A, in case that three second common electrode lines are inserted, the pixel units at both sides of each second common electrode line are also in mirror relationship, which is the same as the description made in conjunction with FIGS. 1A-1C. Furthermore, the common electrodes adjacent to each second common electrode line in longitudinal direction are electrically connected to each second common electrode line directly, which is also the same as the description made in conjunction with FIGS. 1A-1C, and the description of which will be omitted.

The gate lines at both sides of the second common electrode line in the middle, as in FIGS. 1A-1C, are also not connected. It differs from the FIGS. 1A-1C in that, the gate lines at both sides of the left and right second common electrode line are electrically connected through pixel electrode material 13 across the second common electrode line and two vias 12.

Although it is shown in FIGS. 2A-2B that the gate lines at both sides of the second common electrode line in the middle are not connected, the present embodiment is not limited thereto. In case of two-side driving, for a plurality of second common electrode lines, it is allowed that the gate lines at both sides of one second common electrode line (which may be any second common electrode line) are not connected, while the gate lines at both sides of the remaining second common electrode lines except that second common electrode line need to be electrically connected through pixel electrode material 13 across the remaining second common electrode lines and vias 12, so as to ensure that a driving voltage is inputted to the gate of the switching circuit of each pixel unit.

An embodiment in which the array substrate is driven from two sides has been described above, however, the manner of driving an array substrate is not limited to two-side driving, and it may be any driving manner known to those skilled in the art, such as single-side driving. An embodiment of single-side driving will be described below in conjunction with FIGS. 3A-3B and FIGS. 4A-4B.

Figure 3A:
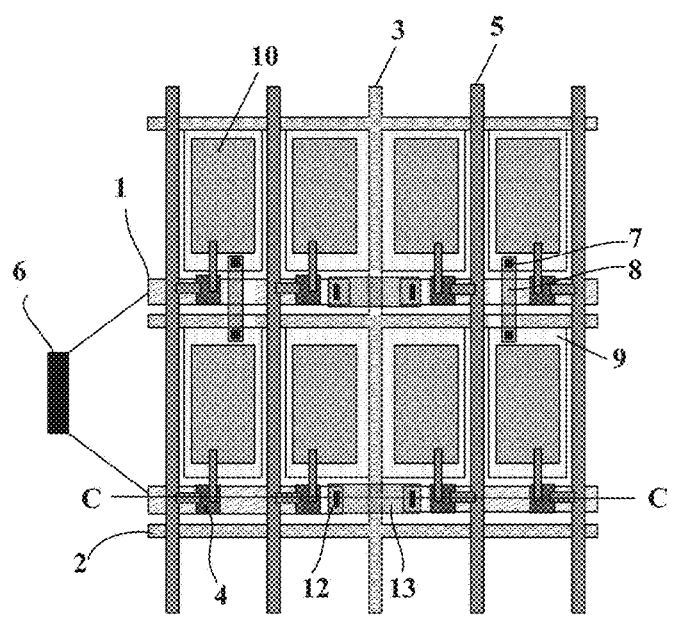
FIG. 3A is a schematic diagram of a single-side driving array substrate according to another embodiment of the present disclosure.
Figure 3B:
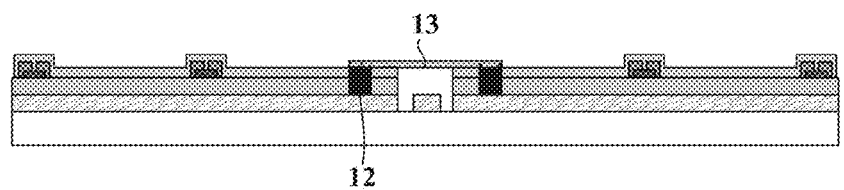
FIG. 3B is a sectional view taken along line C-C in FIG. 3A.

As shown in FIGS. 3A-3B, the array substrate is driven by a driving circuit (such as COF) 6 disposed at one side. In case of single-side driving, the gate lines interrupted by the second common electrode line 3 need to be electrically connected. As shown in FIG. 3, the gate lines at both sides of the second common electrode line are electrically connected through pixel electrode material 8 across the second common electrode line and two vias 7.

Except that the interrupted gate lines need to connected, other structure of the single-side driving array substrate shown in FIG. 3 is the same as that of the two-side driving array substrate described in connection with FIG. 1, and the description of which will be omitted.

Although only one second common electrode line is shown in FIGS. 3A-3B, in case of single-side driving, however, a plurality of second common electrode lines may be provided. An embodiment in which three second common electrode lines are provided in case of single-side driving will be described below in conjunction with FIGS. 4A-4B, however, it is appreciated that any number of second common electrode lines may be provided.

Figure 4A:
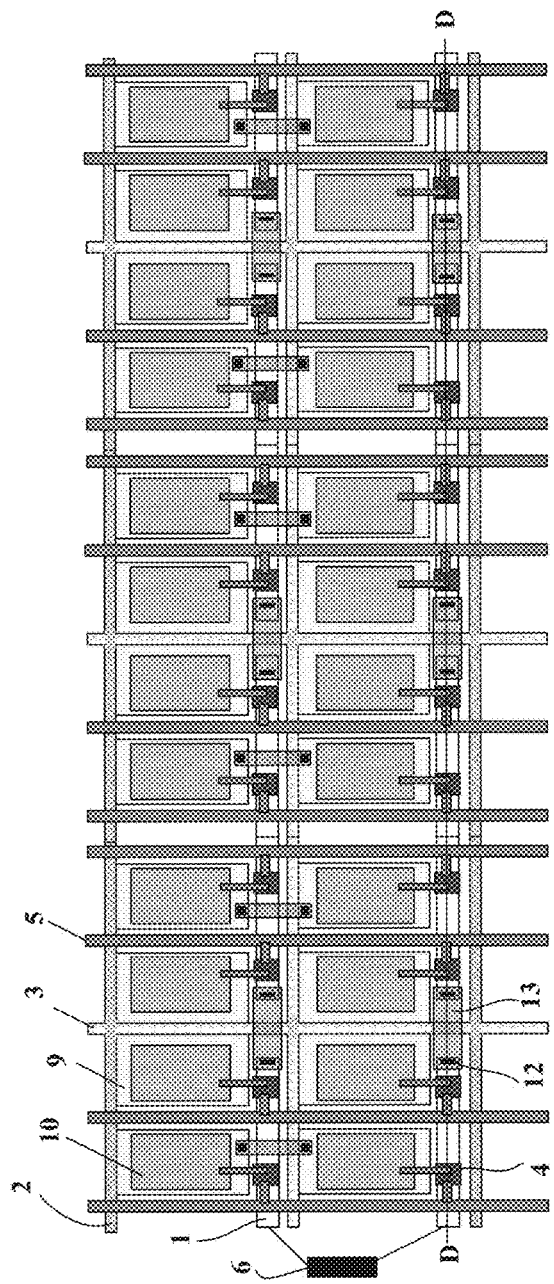
FIG. 4A is a schematic diagram of a single-side driving array substrate according to another embodiment of the present disclosure.
Figure 4B:
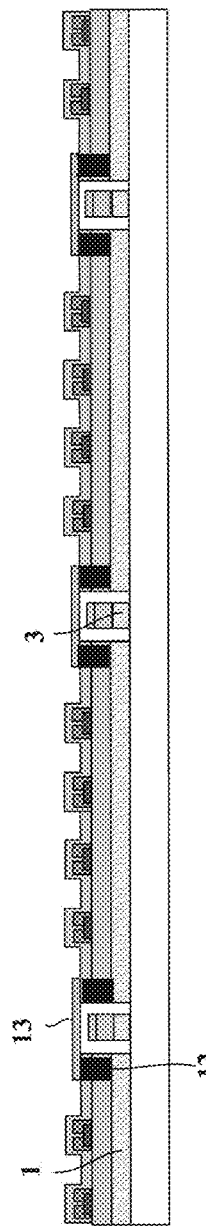
FIG. 4B is a sectional view taken along line D-D in FIG. 4A.

As shown in FIGS. 4A-4B, in case of single-side driving, the gate lines at both sides of all the second common electrode lines are electrically connected through pixel electrode material 13 across the second common electrode line and vias 12. Except for the foregoing, other structure is the same as the embodiment described above in conjunction with FIGS. 3A-3B, and the description of which will be omitted.

Although an embodiment in which the second common electrode line 3 is in a same layer as the gate line 1 and the first common electrode line 2 and is formed with a same conductive material has been described above, the present embodiment is not limited thereto, it is also possible to set the second common electrode line in a layer different from the gate line 1 and the first common electrode line 2.

An embodiment in which the second common electrode line 3 is not in a same layer as the gate line 1 and the first common electrode line 2 will be described below in conjunction with FIG. 5.

Figure 5:
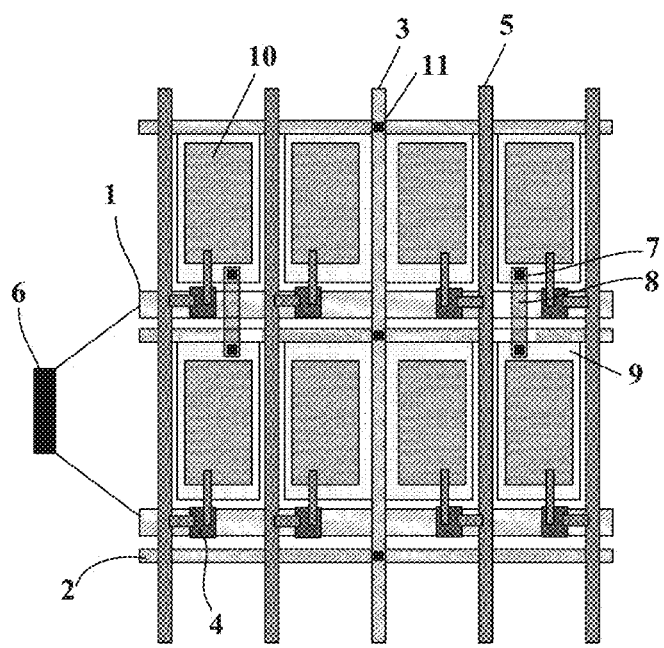
FIG. 5 is a schematic diagram of a single-side driving array substrate according to another embodiment of the present disclosure.

As shown in FIG. 5, compared with the gate line 1 and the first common electrode line 2, the second common electrode line is at an upper layer, the first common electrode line 2, and the second common electrode line 3 are electrically connected through an via 11 at an intersection of the two.

In case that the second common electrode line 3 is not in a same layer as the gate line 1 and the first common electrode line 2, the gate line 1 will not be interrupted by the second common electrode line 3, so that there is no need to connect the interrupted gate lines as in the above embodiment.

In addition, the pixel units at both sides of the second common electrode line 3, as in the above embodiment, are also in mirror relationship, so that decrease in aperture ratio can also be avoided.

In the present embodiment, the second common electrode line 3 is made from metal or a material having high conductivity, whereby uniformity in resistance of the longitudinal common electrodes may be improved, and defects such as after image, greenish, crosstalk etc. are improved.

Figure 7:
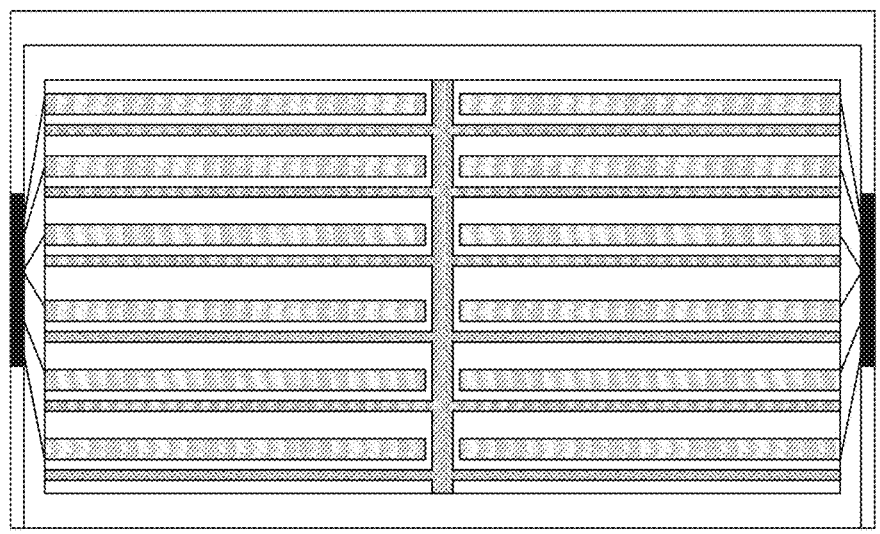
FIG. 7 is a schematic diagram of a COF driving array substrate according to another embodiment of the present disclosure.

In addition, to facilitate understanding of embodiments of the present disclosure, corresponding to the diagram of the existing array substrate in FIG. 10, a COF two-side driving array substrate according to an embodiment of the present disclosure is as shown in FIG. 7 in which a second common electrode line is provided in longitudinal direction. Although one second common electrode line is shown in FIG. 7, it is appreciated that there may be a plurality of second common electrode lines.

Although an embodiment of the array substrate is described above by taking COF driving for example, it is appreciated that the driving manner may also be GOA or other driving manner known to those skilled in the art.

Figure 6:
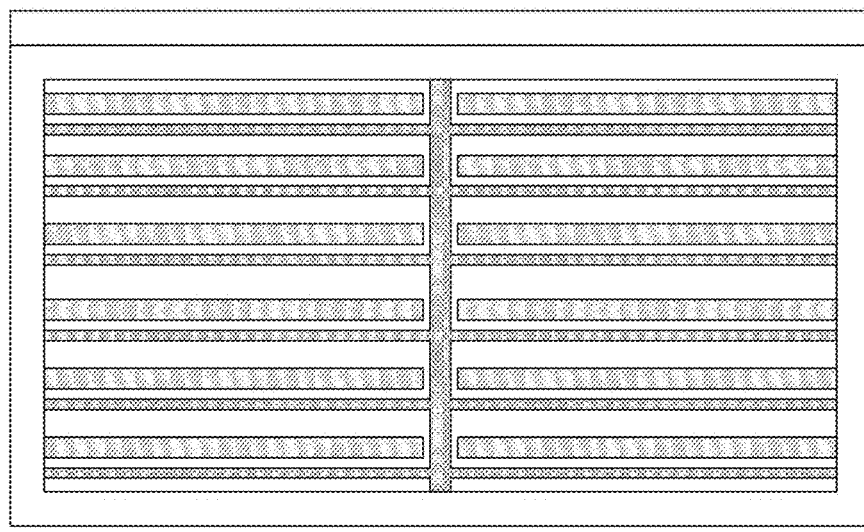
FIG. 6 is a schematic diagram of a GOA driving array substrate according to another embodiment of the present disclosure.

For example, in case that an array substrate uses GOA driving, as shown in FIG. 6, a second common electrode line may also be provided in longitudinal direction. Although one longitudinal common electrode line is shown in FIG. 6, as in the above described embodiment, it is also possible to provide a plurality of longitudinal common electrode lines.

<Display Panel>

Another embodiment of the present disclosure provides a display panel including the array substrate according to one of the above embodiments.

The display panel according to the present embodiment, due to having the array substrate according to one of the above embodiments, can improve the uniformity in resistance of the longitudinal common electrodes, and improve defects such as after image, greenish, crosstalk, etc.

<Display Apparatus>

Another embodiment of the present disclosure provides a display apparatus including the array substrate according to one of the above embodiments.

The display apparatus according to the present embodiment, due to having the array substrate according to one of the above embodiments, can improve the uniformity in resistance of the longitudinal common electrodes, and improve defects such as after image, greenish, crosstalk, etc.

<Manufacturing Method for an Array Substrate>

Another embodiment of the present disclosure provides a manufacturing method for an array substrate, including forming common electrodes on the substrate, forming a gate line extending in a first direction on the substrate, forming a first common electrode line extending in the first direction on the substrate, and forming a second common electrode line extending in a second direction different from the first direction on the substrate, wherein the common electrodes at both sides of and adjacent to the second common electrode line are electrically connected to the second common electrode line.

The manufacturing method for an array substrate according to the present embodiment, by forming a second common electrode line in a second direction, can improve the uniformity in resistance of the common electrodes, and improve defects such as after image, greenish, crosstalk etc.

Although an array substrate, a manufacturing method for an array substrate, a display panel and a display apparatus according to the present disclosure have been described above through some exemplary embodiments, the above embodiments are not exhaustive and those skilled in the art can realize various changes and modifications within spirit and scope of the present disclosure. Therefore, the present disclosure is not limited to these embodiment, and the scope of which is only defined by the accompany claims.

What is claimed is:

1. An array substrate comprising:
   a gate line extending in a first direction;
   a plurality of first common electrode lines, each of the plurality of first common electrode lines extending in the first direction and the plurality of first common electrode lines extending parallel with each other; and
   at least one second common electrode line, each at least one second common electrode line extending in a second direction different from the first direction, and every at least one second common line extending parallel with each other;
   wherein the gate line and the at least one second common electrode line are formed in a same layer, wherein the gate line is divided into two parts by the at least one second common electrode line, and wherein pixel units at both sides of the second common electrode line are in a mirror relationship.

2. The array substrate according to claim 1, wherein the gate line, the plurality of first common electrode lines, and the at least one second common electrode line are formed in a same layer with a same conductive material.

3. The array substrate according to claim 2, wherein the plurality of first common electrode lines and the at least one second common electrode line are directly connected.

4. The array substrate according to claim 2, wherein common electrodes at both sides of the gate line and not adjacent to the at least one second common electrode line are electrically connected via conductive metal across the gate line.

5. The array substrate according to claim 1, wherein common electrodes at both sides of the gate line and not adjacent to the at least one second common electrode line are electrically connected via conductive metal across the gate line.

6. The array substrate according to claim 5, wherein the conductive metal is formed in a same layer with a pixel electrode.

7. The array substrate according to claim 1, wherein, when the number of the second common electrode line is one, the gate lines at both sides of the second common electrode line are not connected, and the array substrate further comprises driving circuits at both sides of the array substrate, wherein the gate lines at both sides of the second common electrode line are each connected to a respective one of the driving circuits at a respective same side of the array substrate.

8. The array substrate according to claim 7, wherein the gate lines at both sides of the second common electrode line are connected via conductive metal across the second common electrode line, and the array substrate comprises a driving circuit connected to the gate line at only one side of the second common electrode line.

9. The array substrate according to claim 1, wherein, when the number of the second common electrode line is more than one, the gate lines at both sides of a first of the plurality of second common electrode lines are not connected, and wherein the gate lines at both sides of the remaining second common electrode lines of the plurality of second common electrode lines are electrically connected via conductive metal across the remaining second common electrode lines, and the array substrate further comprises driving circuits at both sides of the array substrate, wherein the gate lines at both sides of the first of the plurality of second common electrode lines are connected to a respective one of the driving circuits at a respective same side of the array substrate.

10. The array substrate according to claim 9, wherein the gate lines at both sides of the first of the plurality of second common electrode lines are electrically connected via conductive metal across the first of the plurality of second common electrode lines, and the array substrate comprises a driving circuit connected to the gate line at only one side of the first of the plurality of second common electrode lines.

11. The array substrate according to claim 1, wherein the first direction is perpendicular to the second direction.

12. The array substrate according to claim 1, wherein the gate line and the at least one second common electrode line are formed with a same conductive material.

13. A display panel comprising the array substrate according to claim 1.

14. A display apparatus comprising the array substrate according to claim 1.

15. A manufacturing method for an array substrate, the manufacturing method comprising:
   forming a gate line extending in a first direction on the substrate;
   forming a plurality of first common electrode lines on the substrate, each of the plurality of first common electrode lines extending in the first direction and the plurality of first common electrodes extending parallel with each other; and
   forming at least one second common electrode line on the substrate, each at least one second common electrode line extending in a second direction different from the first direction and every at least one second common electrode line extending parallel with each other, wherein the gate line and the at least one second common electrode line are formed in a same layer, and the gate line is divided into two parts by the at least one second common electrode line;

wherein pixel units at both sides of the at least one second common electrode line are in a mirror relationship.

16. An array substrate comprising:

a gate line extending in a first direction;

a plurality of first common electrode lines, each of the plurality of first common electrode lines extending in the first direction and the plurality of first common electrode lines extending parallel with each other; and at least one second common electrode line, each at least one second common electrode line extending in a second direction different from the first direction, and every at least one second common line extending parallel with each other;

wherein the gate line and the at least one second common electrode line are formed in a same layer, and the gate line is divided into two parts by the at least one second common electrode line; and wherein, when the number of the second common electrode line is more than one, the gate lines at both sides of a first of the plurality of second common electrode lines are not connected, and wherein the gate lines at both sides of the remaining second common electrode lines of the plurality of second common electrode lines are electrically connected via conductive metal across the remaining second common electrode lines, and the array substrate further comprises driving circuits at both sides of the array substrate, wherein the gate lines at both sides of the first of the plurality of second common electrode lines are connected to a respective one of the driving circuits at a respective same side of the array substrate.

* * * * *